Figure 1:
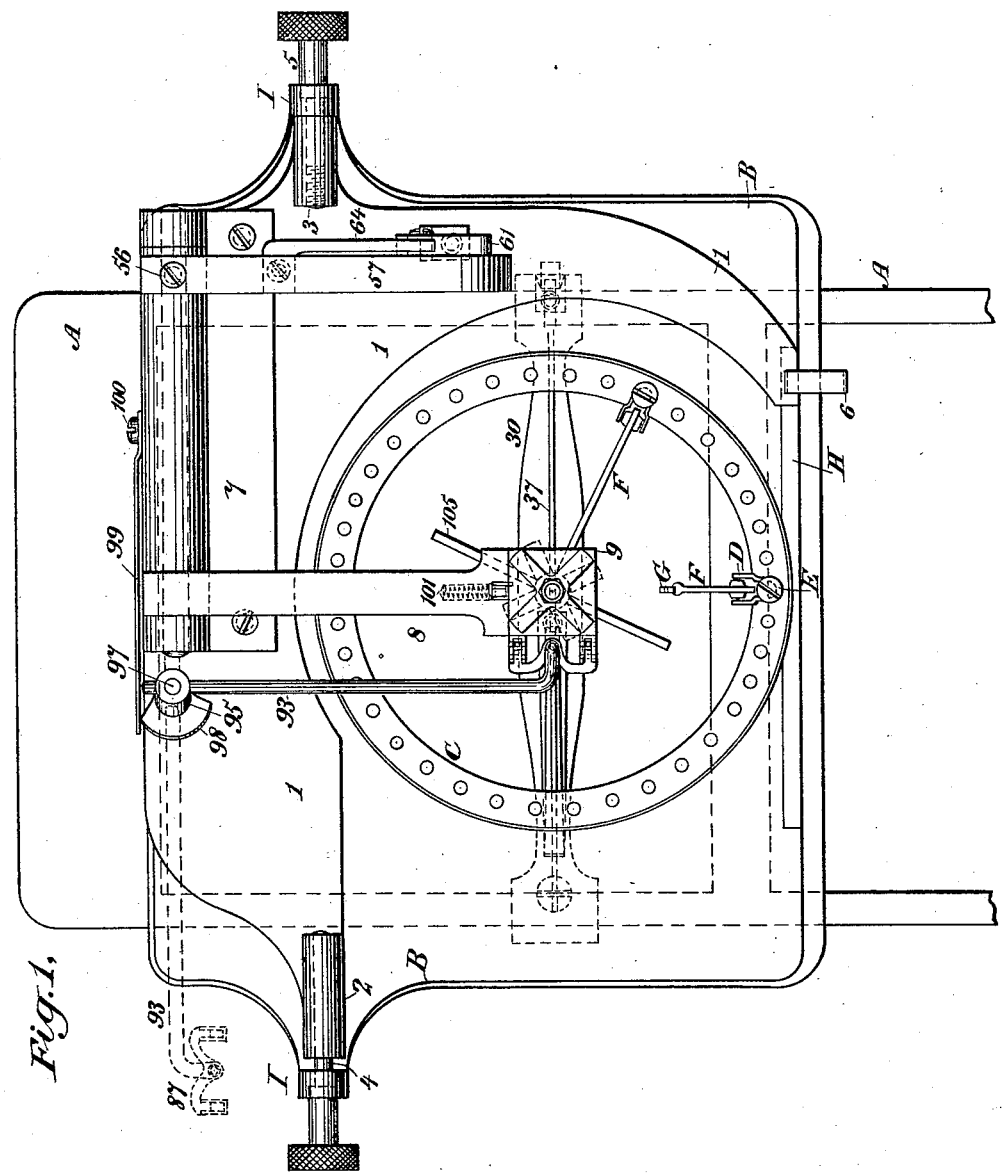

(No Model.) 6 Sheets—Sheet 1.

L. P. DISS.
TYPE LEVELING AND ALIGNING DEVICE.

No. 521,338. Patented June 12, 1894.

WITNESSES:
D. N. Haybrook
I. C. Macdonald

INVENTOR
Louis P. Diss
BY
Jacob Felbel
ATTORNEY

THE NATIONAL LITHOGRAPHING COMPANY,
WASHINGTON, D. C.

(No Model.) 6 Sheets—Sheet 2.
L. P. DISS.
TYPE LEVELING AND ALIGNING DEVICE.
No. 521,338. Patented June 12, 1894.
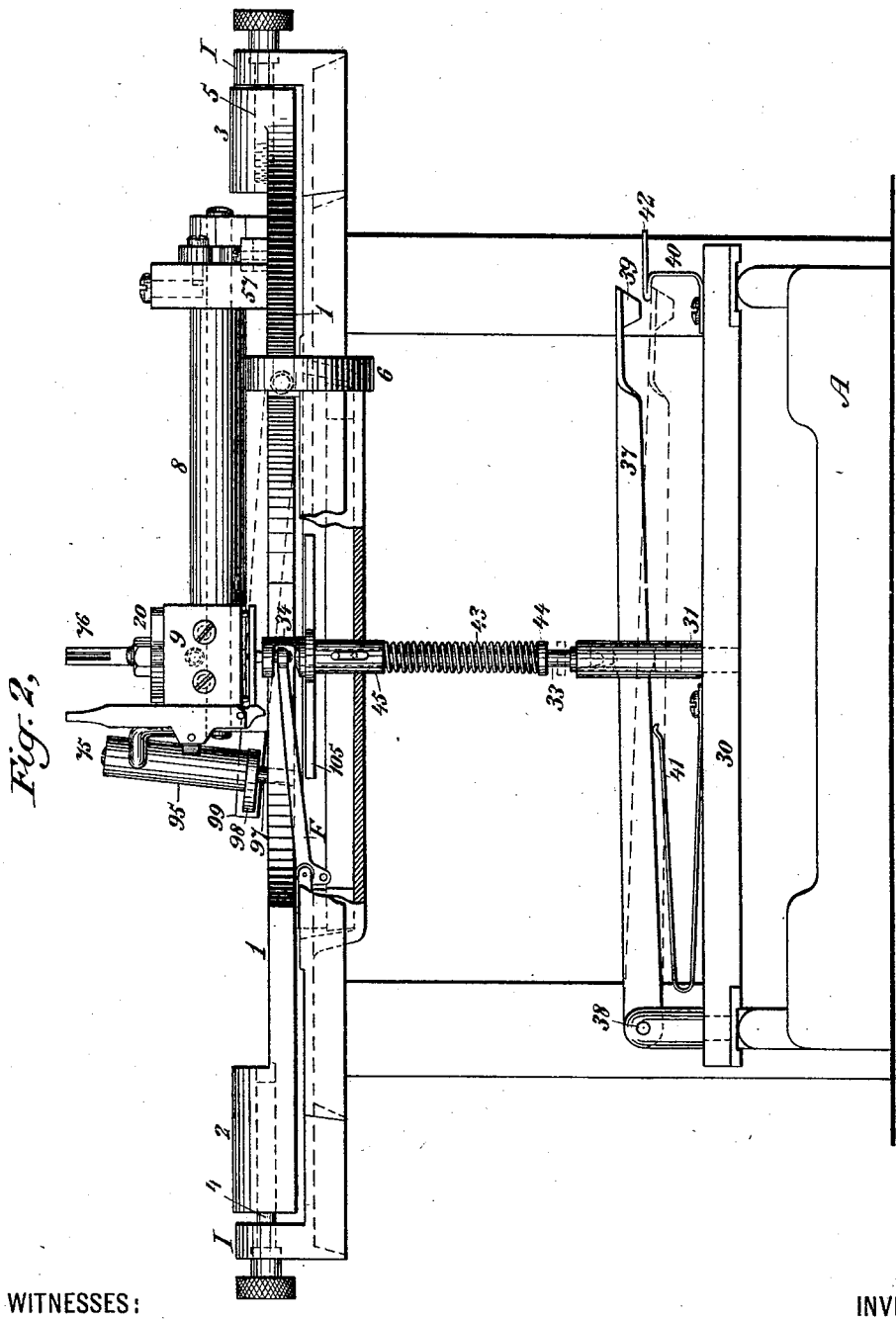
WITNESSES:
INVENTOR
Louis P. Diss
BY
Jacob Felbel
ATTORNEY (No Model.) 6 Sheets—Sheet 3.
L. P. DISS.
TYPE LEVELING AND ALIGNING DEVICE.
No. 521,338. Patented June 12, 1894.
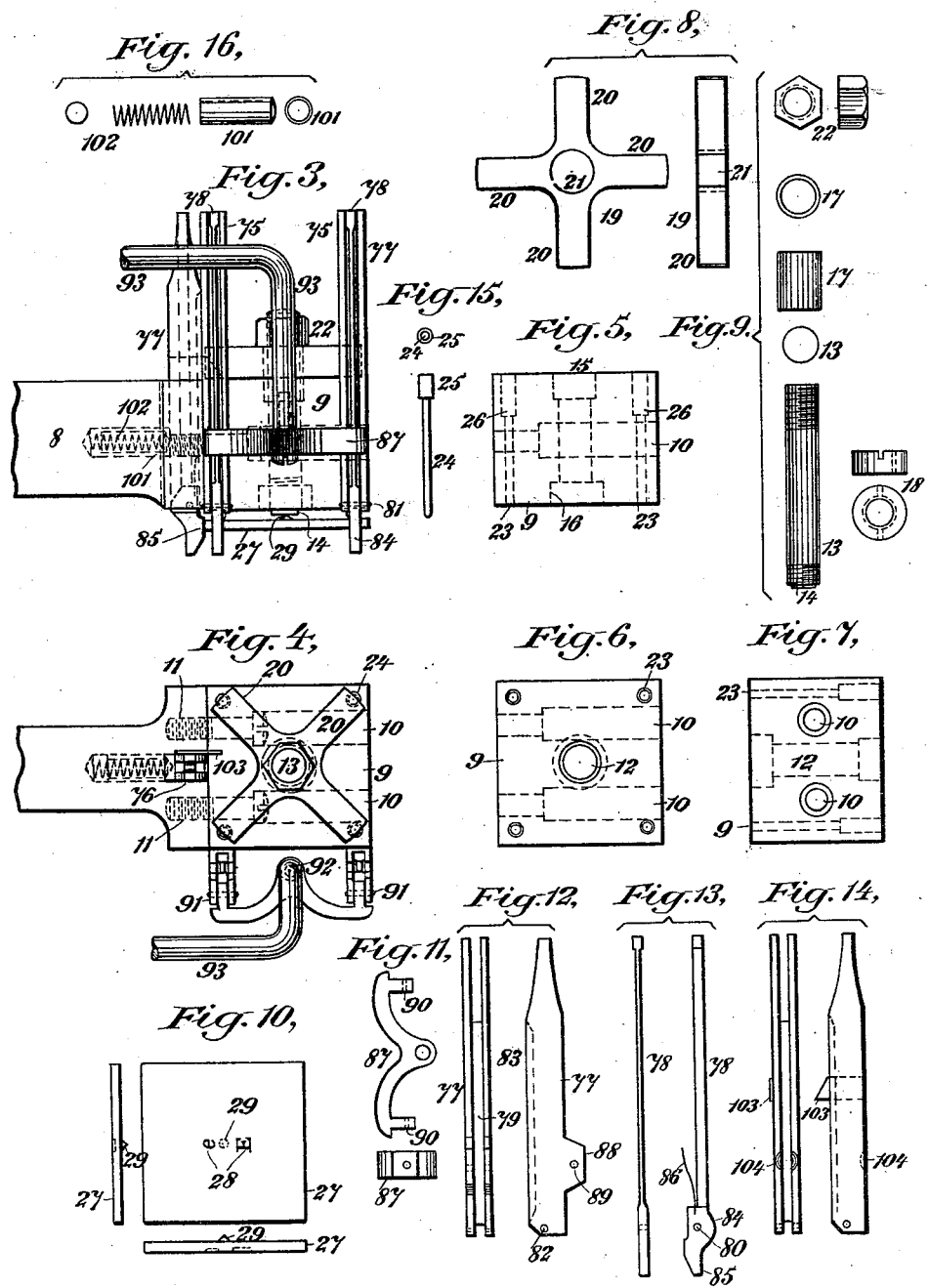
WITNESSES:
INVENTOR
Louis P. Diss
BY
Jacob Felbel
ATTORNEY (No Model.) 6 Sheets—Sheet 4.
L. P. DISS.
TYPE LEVELING AND ALIGNING DEVICE.
No. 521,338. Patented June 12, 1894.
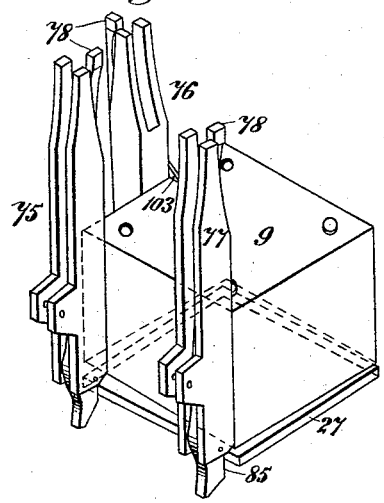
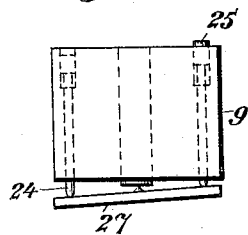
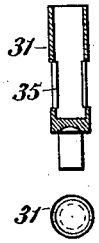
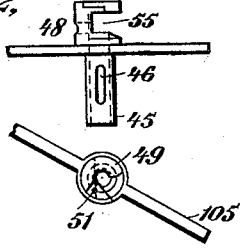
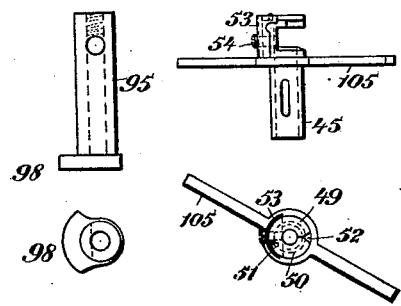
WITNESSES: INVENTOR
D. H. Haywood
I. C. Macdonald
BY Jacob Felbel
ATTORNEY
THE NATIONAL LITHOGRAPHING COMPANY,
WASHINGTON, D. C.

(No Model.) 6 Sheets—Sheet 5.
L. P. DISS.
TYPE LEVELING AND ALIGNING DEVICE.
No. 521,338. Patented June 12, 1894.
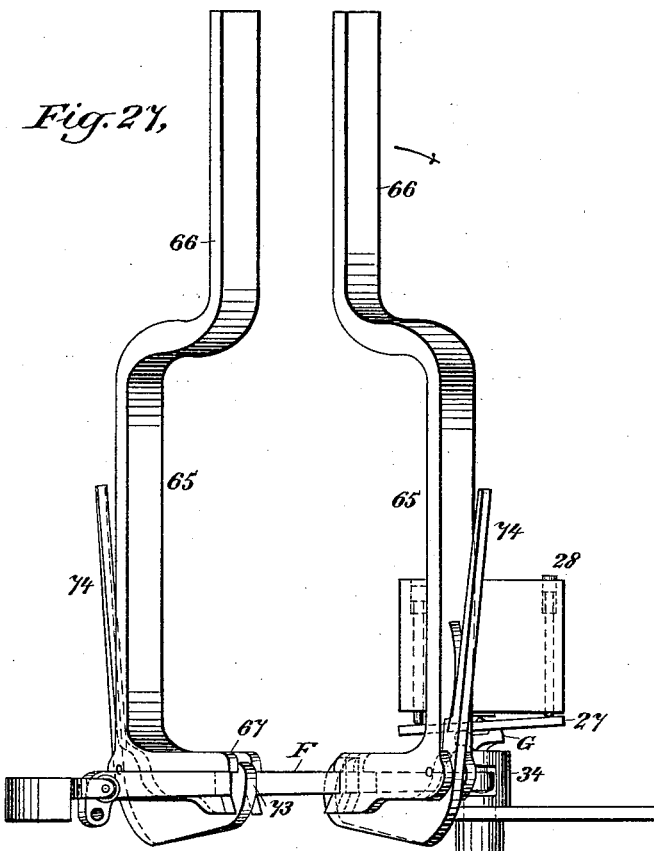
Fig. 27,
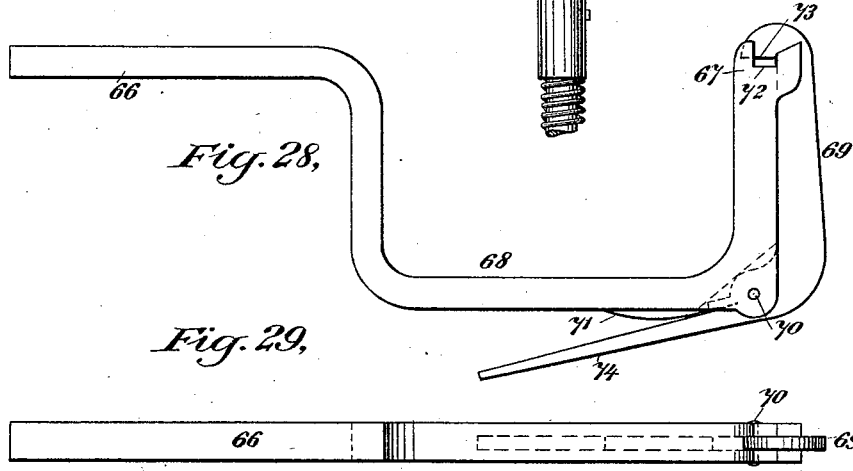
Fig. 28,
Fig. 29,
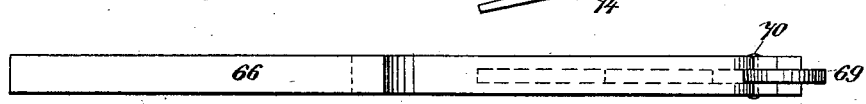
WITNESSES: INVENTOR
Louis P. Diss
BY
Jacob Felbel
ATTORNEY (No Model.) 6 Sheets—Sheet 6.

L. P. DISS.
TYPE LEVELING AND ALIGNING DEVICE.

No. 521,338. Patented June 12, 1894.

WITNESSES:
D. N. Hayward
I. C. Macdonald

INVENTOR
Louis P. Diss
BY
Jacob Felbel
ATTORNEY

THE NATIONAL LITHOGRAPHING COMPANY,
WASHINGTON, D. C.

UNITED STATES PATENT OFFICE.

LOUIS P. DISS, OF ILION, ASSIGNOR TO THE WYCKOFF, SEAMANS & BENEDICT, OF NEW YORK, N. Y.

TYPE LEVELING AND ALIGNING DEVICE.

SPECIFICATION forming part of Letters Patent No. 521,338, dated June 12, 1894.

Application filed November 14, 1893. Serial No. 490,879. (No model.)

*To all whom it may concern:*

Be it known that I, LOUIS P. DISS, a citizen of the United States, and a resident of Ilion, in the county of Herkimer and State of New York, have invented certain new and useful Improvements in Type Leveling and Aligning Contrivances, of which the following is a specification.

My invention relates to a contrivance for use in leveling and aligning the types of a type writing machine, and has for its main object to facilitate and cheapen the work, which is commonly designated as "type-aligning," and in which the types are adjusted by turning them in their sockets and by bending, twisting, and moving their type-bars. After the type-bars are placed in the machine, the types are first leveled and next aligned. The process of leveling comprises bending and twisting operations of the type-bars, for the purpose of bringing all of the type-faces level or horizontal in the impression plane, so that they may strike the paper squarely at the printing point and leave an impression of the entire character thereupon. If at the printing point the plane of a type-face should be at an angle to the impression plane, only a portion of the type will print, and whenever this condition exists the type is said to be out of level or "off its feet." The process of aligning relates more particularly to adjustments of the type and type-bars for the purpose of having each type of the series strike at a common center, and comprises rotative movements of the type in its socket and radial and swinging movements of the type-bar, the former in order that the type shall strike upright or at right angles to the line being written or travel of the paper, and the latter in order that the types may strike a common point. If the types fail to strike upright or to strike the common point the machine is said to be out of alignment.

My invention consists in the employment of a plate or matrix to aid in determining the adjustment required in leveling and aligning the type; also in suitable means to indicate the level and alignment of the plate or matrix, whereby the level and alignment of the type are indicated; also in suitable means for supporting and holding the type in proper position to be leveled and aligned; also in suitable means to facilitate the placing of the type and plate or matrix in position to be leveled and aligned; and also in suitable wrenches to facilitate the leveling of the type.

Furthermore, my invention consists in certain other novel features of construction and combinations of devices, all as will be hereinafter more fully described and particularly pointed out in the appended claims.

In the accompanying drawings, Figure 1 is a plan view of a portion of a Remington type writing machine having my leveling and aligning contrivance applied thereto. Fig. 2 is a front elevation of the same. Fig. 3 is a detail elevation, taken at the left hand side of Fig. 1, of the leveling, aligning and indicating devices. Fig. 4 is a top plan view of the devices shown at Fig. 3. Fig. 5 is a side elevation of the leveling and aligning block. Fig. 6 is a top plan view of said block. Fig. 7 is a front elevation of said block. Fig. 8 shows in plan and edge elevation the cap or cover for the indicating-pins. Fig. 9 comprises in one view the block screw, collar, and nuts, each device being shown both in side elevation and in plan. Fig. 10 shows in plan and edge views the leveling and aligning plate or matrix. Fig. 11 is a detail view in plan and end elevation of the yoke used in connection with the side indicators. Fig. 12 shows in front and side views one of the indicators employed at the side of the block and plate or matrix, but omitting the tongue. Fig. 13 shows in similar views the indicator tongue. Fig. 14 shows in similar views the indicator used at the back of the block and plate or matrix, omitting however the tongue. Fig. 15 shows in plan and side elevation one of the indicating pins. Fig. 16 shows the rear indicator detent and its spring, both devices being shown in top and side views. Fig. 17 is a front elevation of the block, the leveling-pins, and the plate or matrix, the latter being out of level. Fig. 18 is a perspective view of the parts shown at Fig. 17 with the indicators added. Fig. 19 shows in elevation and plan the type-rest spindle. Fig. 20 shows in plan and edge views the latch spring. Fig.

Figure 30:
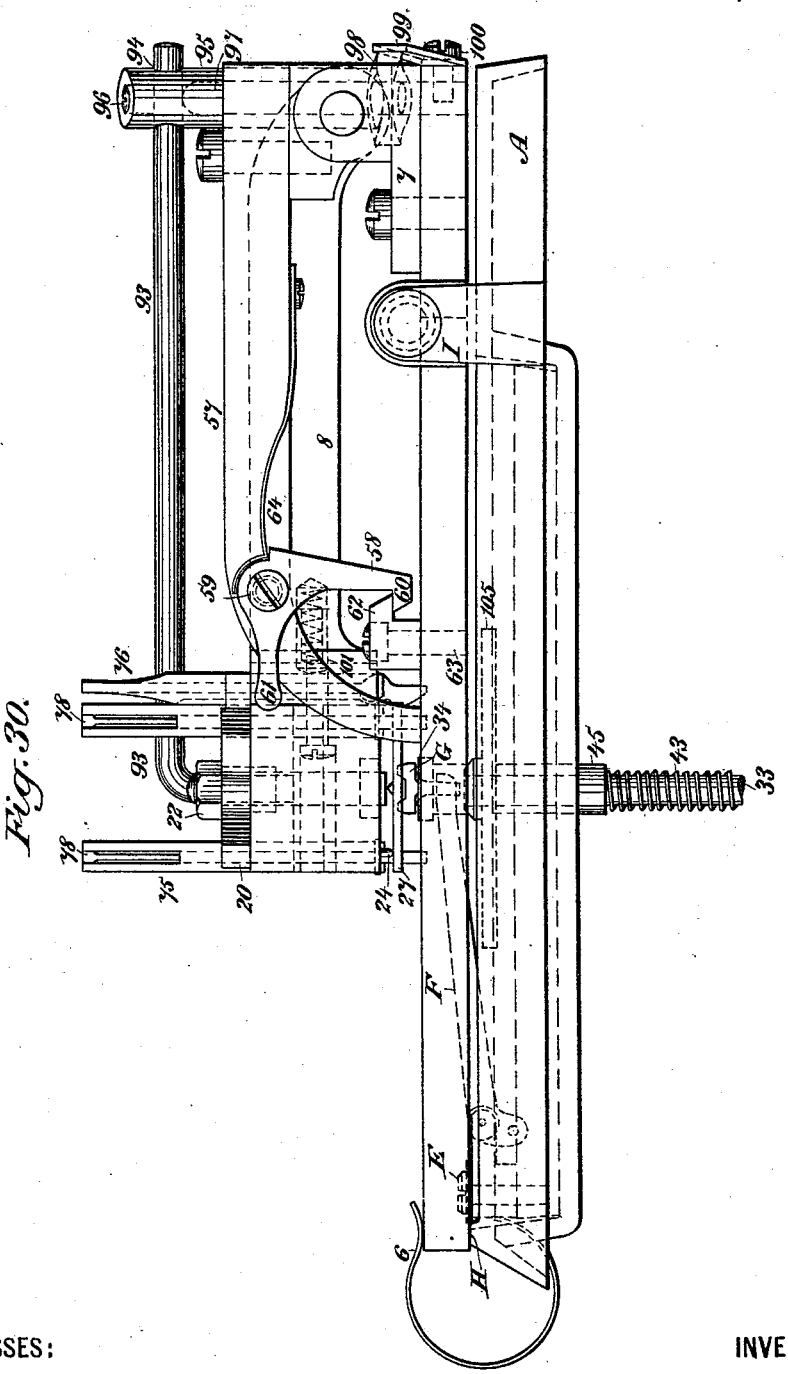

21 shows in plan and vertical section the hollow supporting post. Fig. 22 shows in plan and vertical section the spindle step or holder. Fig. 23 shows in plan and side elevation the type-rest without the latch. Fig. 24 shows in plan and edge views the type-rest latch. Fig. 25 shows in plan and side elevation the type-rest with its spring and latch. Fig. 26 shows in plan and side elevation the support for the indicator arm. Fig. 27 is a detail elevation showing the leveling operation, the wrenches being applied to the type-bar. Fig. 28 is a plan view of one of the wrenches. Fig. 29 is an edge view of the same; and Fig. 30 is a side elevation of the upper portion of the writing machine, with my improvements applied thereto in working relation.

In the several views the same parts will be found designated by the same letter or numeral of reference. For the parts of the type writing machine proper, I shall use letters of reference, while for the parts of the leveling and aligning contrivance, I shall employ numerals.

As will be observed, I have shown my invention employed in connection with a "Remington No. 2" machine, but it will of course be understood that my improvements are applicable to the entire class of type-bar machines, although various changes in detail construction or arrangement may have to be made to adapt the contrivance to special makes of machines.

A designates the frame work of the type-writer, B the top-plate, C the type-ring, D the type-bar hanger attached by a screw E to the type-ring and adjustable radially thereof, F the type-bar or lever, G the type, H the front carriage-track or way, and I, I, ears or standards rising from the top-plate for supporting the rear carriage guide-rod.

For the purpose of insuring uniformity in the level and alignment of the types of any number of machines aligned with my instrument, and so that a carriage suitably adjusted for the alignment of one machine will be suitable for any number of like machines aligned with my instrument, I locate the latter by the same points that govern the plane of the carriage, consequently the plane of the platen also. This is essential because the types must be adjusted to print in alignment in the plane in which they strike the platen. Therefore, the holes in the ears or standards, and the track or way of the top-plate which govern the plane in which the platen moves, are employed by me to govern the location of the leveling and aligning instrument.

The base-plate 1 of the contrivance is provided on its upper side with two tubular projections 2 and 3, arranged in line with each other and adapted to register with the perforations in the ears or standards I, I, on the top-plate. A pin 4 is passed horizontally through the perforation in the left hand ear and into the tubular projection 2, while a screw 5 is passed similarly through the perforation in the right hand ear and engaged with the tubular projection 3, which is threaded interiorly to match the threaded portion of the screw. The base-plate 1 is provided with a curved, forwardly-projecting arm which extends to and rests upon the carriage track or way H, and at this point is secured by a spring-clamp 6, as shown. Upon the base-plate 1 is secured a supplemental plate 7, to which is preferably hinged at its rear end an arm or support 8, the forward end of which extends to near the middle of the type-ring to receive and support a head or block 9, preferably made rectangular and with its center arranged to coincide with the center of the type-ring. The said block is provided with two horizontal perforations 10, for the passage of screws 11, whose threaded ends enter threaded holes formed in the face of the arm 8, whereby the block is securely attached to said arm. Vertically through the center of the block is formed a perforation 12, through which is passed a screw or pin 13, having screw threads at each end, and a short neck at its lower end to form a bearing 14, for a purpose to be presently explained. The upper and lower ends of the vertical perforation 12 are enlarged to form circular seats 15 and 16, the former for the lower portion of a sleeve or collar 17, and the latter for a nut 18, which is provided with a nick to enable it to be attached to the pin 13 by a screw-driver. The sleeve 17, surrounding the pin 13, projects above the block and receives a cap or cover 19, comprising preferably four arms 20, and a central perforation 21, which is passed over the sleeve. A nut 22 is then screwed upon the upper end of the pin to hold it and the cap in proper working positions. Four vertical perforations 23 are made through the block, one at or near each corner, to accommodate four pins 24, which are headed at their upper ends, as at 25, to engage shoulders 26, formed in the perforations, and prevent the pins from falling out of the block. The arms 20 of the cap extend over and swing close to the pin-holes 23, as shown and for the purpose hereinafter explained.

In connection with the block, the four pins, and their cap, there is employed a leveling and aligning plate or matrix 27, made rectangular and conforming in length and breadth to the under side or base of the block. I prefer to make the plate 27 in the form of a matrix, that is to say, with a sunken type-impression, (which may be complete or partial only) and to use a separate matrix for each different type, although in so far as some of the features of my invention are concerned, a single plate for all of the types may be employed instead.

Where separate matrices are employed they are all made of a uniform shape and size and differ only in the type impressions, which are made to correspond wholly or partially with the various types used in the machine.

The plate or matrix is employed in the leveling operation and also in the aligning operation, and bears such a relation to the block 9 as that when its face is parallel with the horizontal face of the block the type being operated upon will be level; and the depressions or type-impressions 28 are so located in the plate or matrix as that when the vertical sides of the latter coincide with the vertical sides of the block, the type will be aligned.

For the purpose of suitably holding the plate or matrix on the type in the process of leveling, I provide the former with a pointed projection 29, located centrally of the depressions or type-impressions, which projection is pressed against the bearing 14 at the lower end of the pin 13, by the pressure of the type G, which is actuated by the type-supporting contrivance to be presently described. The type is held in the leveling and aligning position by a supporting contrivance consisting preferably of a bridge 30, secured to the frame work at the base of the typewriter, having a hollow post 31, centrally arranged, into which is movably fitted a step 32, which receives loosely the lower end of a spindle 33, that carries at its upper end a type-rest 34. The post 31 is slotted at 35 and the step at 36 and through these slots passes a lever 37, which is pivoted at 38 to an upright on the bridge and provided at its opposite end with a wedge 39, adapted to force back a bent spring 40, secured to the bridge, when the lever is depressed, the upper inwardly-turned end of the spring catching over the end of the lever when the wedge has passed by, to hold the lever in the depressed condition shown in dotted lines at Fig. 2, against the upward tendency of its spring 41, also attached to the bridge. The spring-catch is formed or provided with an outwardly-extending finger-piece 42, for conveniently releasing the lever when desired. Surrounding the spindle 33, is a spiral spring 43 one end of which bears against a collar 44 on the spindle and the other end against the lower end of the type-rest. The spring 43 is weaker than the spring 41, and is employed to hold the type and plate or matrix in the aligning plane sufficiently firm for the aligning operation, after the pressure of the spring 41 has been removed, which being too great for the aligning process, is used for the leveling process only. In the lower tubular end 45 of the type-rest, which is mounted on the spindle, is a slot 46, in which works a pin 47 projecting horizontally from the spindle. When the lever 37 is unlocked or freed from its catch, the stronger spring 41, presses up the lever, the step, and the spindle, and causes the pin 47 to occupy a position at the upper end of the slot 46, whereby the type-rest is supported or sustained by the force or pressure of said spring. When the lever 37 is depressed and latched down, the pin 47 is drawn from the upper end of the slot to about the position shown by the dotted lines at Fig. 2, and the type-rest is relieved from the force of the spring 41. Simultaneously, however, the weaker spiral spring 43 operates to exert its force to maintain the type and the plate or matrix in the aligning plane. The object of employing the weaker spring 43 is to have as little friction as possible between the projection 29 and the lower end of the pin or the bearing 14, as this friction has to be overcome by the resiliency of the type-bar, which is not great enough to overcome a friction that would be caused by the spring 41. In other words, if the type end of the type-bar should be sprung sidewise it would be held there by the friction of the projection 29, and its bearing, if this friction were greater than the resilient force of the type-bar. A type thus aligned would be aligned with its bar strained, from which strain it should be entirely free. To avoid this strain I have made the spring 43 as weak as the aligning operation will admit of. The type-rest consists of the tubular portion, or sleeve 45 and a head 48, having jaws 49 and 50 for holding the shanks or stems of the types. The jaw 49 is preferably formed integral with the head and the jaw 50 is preferably pivoted to the head as at 51. Both jaws lie in the same horizontal plane, are segmental in shape, and are cut on a slant at their adjacent free ends to form a V-shaped notch 52, to facilitate the entrance of a type-stem. A curved plate-spring 53, with short arms is attached by a screw 54 to the head, to press on the jaw 50 and keep its free end normally against the rigid jaw 49. Below the latch or jaws is an opening or space, as shown at 55, for the accommodation of the free end of the type bar and the lower end of the type.

The object of this construction of type-rest is to provide for readily encompassing the type-stem and in such a manner that when the type is moved in the aligning plane the type rest will move with it. By pressing the type-rest against the stem of the type, with the stem in the notch, the latch will swing open and the type-rest will be moved into position, after which the spring-latch closes automatically. Thus the type-rest will embrace the stem of the type and bear against the under side of the head of the type, as clearly illustrated.

For the purpose of facilitating the placing of the type in the type-rest, and the plate or matrix on the type I have provided for swinging the arm 8 up and back, by pivoting it to the hinge plate as described. Locking means are provided for the purpose of holding the arm 8 down in working position. On the hinge-pin of the arm is secured by a screw 56, a horizontal, forwardly-projecting arm 57, which at its free end is curved or bent downwardly to bear against the top-plate 1. The said arm carries a latch 58, which is pivoted at 59, and has a lip 60 and a handle-portion 61. The lip 60 is adapted to engage with a catch-plate or hook 62, fastened on the base-plate by the screw 63, and a spring 64, secured to the arm 57 at one end and bearing at its free end against the latch, is provided for holding the latter in engagement with its keeper when the arm is down. By depressing the handle 61, the latch may be disengaged and the arm 57 and the parts connected thereto swung up and back. The arms 8 and 57 move together and hence either one may be caught hold of to bring both back to working position. In the descent of the arm 57, the latch automatically engages its keeper, both devices having beveled faces. It will be seen that while the arms are upturned, the placement of the type and the plate or matrix is greatly facilitated.

I shall now describe the operation of leveling a type: The type-bar is raised and the type-rest is moved over and its jaws caused to embrace the stem of the type. The type-rest step and spindle permit the type-rest to be moved sidewise to make way for the raising of the type and also permit the type-rest to be rotated to present its space or opening 55, and the notch 52, or mouth of the jaws in the direction of the pivot of the type-bar and the stem of the type being operated upon. After the stem of the type has been clasped by the jaws, a plate or matrix is laid upon the face of the type, with the type-characters fitting the depressions. The arm 8 is then brought down and locked, and the lever 37 being now unlatched, the projection 29 presses against its bearing 14, under the force of the stronger spring 41. If the particular type being operated upon should happen to be level the plate or matrix will stand in a horizontal plane and parallel with the under side of the block; but should such type be out of level the plate or matrix will tip or incline to conform to the plane of the face of the unlevel type, owing to the pointed projection and the pressure of the spring 41, and hence the want of level of the type will be indicated to the eye of the operator. But to more readily detect any inaccuracies in the relation of the plate or matrix to the block, or in other words, to render more evident any lack of parallelism between the plate or matrix and the block, I have provided the latter with the four vertical pins 24, which are of such length that when their lower ends rest on the plate or matrix of a leveled type, as shown at Figs. 1 and 2, the upper surface of the pins will be even or flush with the upper surface of the block, while when the plate or matrix rests upon an unlevel type one or more of the pins will project above the upper surface of the block and indicate to the operator not only that the type is out of level but also the direction of its pitch or slant. To avoid reliance, however, upon the eyesight of the operator, and hence to further insure accuracy, I have provided the block with the pivoted cap, 19, by which the smallest error in the level of the type may be instantly detected. During the leveling operation the cap-arms are turned by hand to the dotted positions shown at Fig. 1, and when the type is supposed to be level the cap is used as a final test, by partially rotating it for the purpose of bringing all four of its arms over all of the pins. In this operation, if any one of the pins should project even minutely above the block, it will obstruct one of the arms and hence prevent all of the arms from covering the pins, and when this happens the operator is mechanically informed that the type is still out of level. The cap also serves to cover the pins, in the aligning operation, whereby the matrix or plate is less liable to tip and work off the type when it is being moved into the alignment position.

The type are leveled by bending and twisting the type-bars, as heretofore, by novel implements to be presently described. I employ a pair of wrenches, 65, which devices, in the leveling operation, are applied to the type-bar as shown at Fig. 27. The addition of weight to the type-bars of these wrenches necessitates a stronger spring than that which is suited for the aligning operation, and for this reason I have provided the spring 41, and the means described for readily bringing it into action, and for withdrawing it. Each wrench consists of a handle 66, a fixed jaw 67, an intermediate U-shaped bend 68, and a spring-pressed, pivoted jaw 69. The shank of the rigid jaw forms one side of the bend 68, and is slotted to receive the movable jaw 69, which is pivoted at 70 and held in position by its spring 71. The bifurcated rigid jaw is formed with a notch or seat 72 for the type-bar, and the pivoted jaw with a flat-faced hook 73, to act in opposition to the seat, in the bending and twisting of the type-bars. The U-shaped bend in the wrench is provided to enable the implement to straddle or partially surround the hinged arm 8, and facilitate the manipulation of those type-bars which are located or come under the said arm. To attach the wrench to the type-bar the finger-piece 74 of the pivoted jaw is pressed inwardly, whereby the hook 73 is swung down and the wrench opened. The wrench is then placed upon the type-bar, the finger-piece released, and the spring allowed to act, by which the hook is swung upward and the encompassment of the type-bar completed, as illustrated at Fig. 27. As will be seen, the jaw 69 is so pivoted to the shank of the rigid jaw, which is arranged at right angles to its handle, that it has the least possible tendency to swing in a direction to open the wrench, when twisting a type-bar, that the accurate encompassment of the type-bar will admit of. The wrenches clutch or grasp the type-bar at two points and by moving the handles simultaneously in the direction of the length of the type-bar a widthwise bend of the latter will be effected between the wrenches. If the handles be thus moved toward each other a downward widthwise bend of the type-bar will result, while if the handles be moved in the opposite direction or away from each other an upward widthwise bend of the type-bar will be effected. If the wrenches be moved simultaneously in opposite directions transversely of the type-bar a twist in the latter will be made, which twist may be produced in either direction according to the direction in which that wrench nearer the type is turned. The bending directions and the twisting directions it will be understood are all indicated to the operator by the plate or matrix, the block, and the pins. For example, the position of the plate or matrix and the right hand pin at Fig. 27, indicates that the leveling of the type is to be effected in this instance by a twist of the type-bar and a movement of the inner wrench in the direction of the arrow. Having properly leveled the type, the wrenches are removed, the lever 37 is depressed and locked to throw out of action the spring 41, and the aligning operation then resorted to. The type-bar hanger screw E is first loosened to free the type-bar and enable the type to be moved in any direction in the leveling plane. The type is then moved or adjusted to a position in which the vertical sides of the plate or matrix, (which is carried with the type at this time) coincide with the vertical sides of the block, after which the screw E is again tightened. The cap 19 having previously been turned to cover the pins there is little or no liability of the plate or matrix tipping during the movement of the type into the alignment position.

To more accurately determine the coincidence of the plate or matrix and the block—which coincidence indicates that the type is in alignment—I have provided indicators and of such a construction that any want of coincidence or lack of perfect register between the sides of the plate or matrix and the sides of the block is magnified, whereby the operator is more readily notified of any imperfection in the alignment however slight it may be. Two of these indicators, 75, 75, are arranged preferably on the left hand side of the block and one 76 is arranged on the rear side of the block. The indicators are all essentially the same in construction, the only difference being in the means for holding them in position. Each indicator consists of an upright or bar 77, and a tongue or pointer 78, supported thereby. The bar is preferably formed or provided with a slot 79, to accommodate the tongue or pointer, which is perforated at near its lower end, as shown at 80, to receive a pivot-pin 81 which passes through said perforation and through coincident perforations 82 in the slotted bar, the straight or plane face of which is designated by 83. The root 84 of the tongue has a straight face 85 and is provided with a spring 86, whose free end bears against the bottom of the slot in the bar and operates to hold the face 85 against the matrix. The tongue is so made and pivoted as that when its face 85 is in line with the face 83 of the bar, the upper ends of the bar and tongue will coincide; and the tongue being pivoted at the locality shown a movement at its lower end will be increased or magnified at its upper end. By this it will be seen that when the faces of the indicators are held against the vertical sides of the block and the faces of the tongues are held against the vertical sides of the plate or matrix, any inaccuracies in the alignment of the type will be indicated and magnified at the upper ends of the indicators. The two indicators 75 are pivotally connected to a yoke 87, so that they may swing in a vertical plane. For this purpose each indicator bar 77 is formed with two ears 88 having coincident horizontal perforations 89, which register with a perforation 90 in the yoke and receive a pivot-pin 91. The yoke is vertically pivoted at 92 to an arm 93 so that it may swing in a horizontal plane. By thus pivoting the yoke and the indicators the faces 83 of the latter may readily adjust or seat themselves squarely to or against the side of the block. The indicator arm or support 93 is bent at right angles and extends to the rear of the machine where its end is passed into a horizontal perforation 94 in a support or bearing 95, and secured by a vertical screw 96, in a threaded hole in the support. The support 95 is drilled out to form a bearing for an inclined or obliquely-arranged pivot 97 rising from the base-plate, and the lower end of said support is formed or provided with a cam 98, against which bears a spring 99, secured to the base-plate by a screw 100. By this construction when the indicators 75 are swung against the block by hand the spring holds them there, and when the indicators are swung back to the dotted line position of Fig. 1, the spring likewise operates to maintain them in this position. The pivot 97 is obliquely arranged in order that the indicators 75 when moved away from the block will swing upward and backward and avoid the type-bar hangers. The indicator 76 at the rear of the block is loosely fitted to a slot in the face or forward end of the hinged arm 8, and is held against the block by a detent 101, which is hollow and provided with a spiral spring 102, and arranged to operate in a horizontal hole or opening in the hinged arm, as shown.

To avoid friction between the matrix and tongues in the type-leveling operation, I have provided for moving all of the tongues away from the matrix. It is for this reason that the indicators 75 are swung to the position shown in dotted lines at Fig. 1. The tongue of the indicator 76 is at the same time removed from contact with the plate or matrix by pulling up the indicator to a sufficient height where it is held during the type-leveling operation by the pressure of the detent. After the type has been leveled, this indicator may be brought into use by simply pushing down upon it until the lip 103 thereon bears against the top of the block, when the convex end of the detent will spring into a cut or depression 104 in the indicator, thus holding the latter in position to test the alignment of the types.

It will be observed from the foregoing and from the drawings that if the type should be out of alignment one or more of the tongues will indicate the fact to the eye of the aligner and by the direction and extent of deflection of the tongue or tongues the aligner will also be informed of the character and amount of the error and of the direction or directions in which the type must be moved to bring it into alignment, thus greatly facilitating the aligning operation while at the same time providing for the greatest accuracy thereof.

The moving of the type from the position in which it may have been leveled to the aligning position, it will be understood does not disturb the level of the type.

The type-rest is provided with a handle 105 which may be held by one hand while the type is being turned in its socket with a suitable wrench by the other hand, thus supporting the free end of the type-bar and preventing a strain which might loosen or impair its bearings.

I regard as a matrix any plate having a depression to fit so much of a type as is necessary to properly locate it on the type. In practice, I have used matrices not containing counterparts of the whole type-face, but only counterparts of as little of it as their proper location will admit of, and of that portion which provides the greatest distance between their bearing points. For this reason I do not wish to be limited to the employment of a plate having a depression the counterpart of the entire type-face, though of course such a plate may be used if desired.

In instances where the type-face is not wide enough, as is the case with the colon and semicolon, for example, I make the matrix with its impression deep enough to be controlled by the side of the type or by the type-head.

While with a series of matrices the work may be greatly facilitated and cheapened, as compared with the means heretofore employed, and at the same time the very best results are produced thereby, yet I do not wish to be entirely limited thereto, and although I have shown my invention used in connection with a machine having two types on a bar, it will be understood that the same may be employed for leveling and aligning machines having only one type on a bar, as well as those having more than two types on a bar.

Various other changes in detail construction and arrangement may be made without departing from the spirit of my invention.

What I claim as new, and desire to secure by Letters Patent is—

1. In a type leveling contrivance, a matrix or plate having a type depression to receive the face of the type and adapted to rock or tilt under the pressure of the type and indicate whether or not the latter is level.

2. In a type leveling contrivance, the combination of a rocking or tilting plate having a type depression to receive the face of a type, and means for indicating the plane of the plate and the type.

3. In a type leveling contrivance, the combination with a head block having a surface arranged in a horizontal plane centrally of a system of type-bars in a type writing machine, of an independent, movable plate adapted to work against said block to indicate the plane of the type face when the latter is brought to bear against it.

4. In a type leveling contrivance, the combination with a head block having a surface arranged in a horizontal plane centrally of a system of type bars in a type writing machine, of an independent, movable plate having a matrix or type impression and adapted to work against said block to indicate the plane of the type face when the latter is in the matrix and the type is pressed against the same.

5. In a type leveling contrivance, the combination with a device having a surface arranged in a horizontal plane centrally of a system of type-bars in a type writing machine, of an independent, movable plate adapted to receive the type and indicate the plane of its face, and means for indicating whether or not the type face and the plate are level.

6. In a type aligning contrivance, a plate having a type impression to receive the type face and movable therewith in the leveling plane to locate the type at the printing center.

7. In a type aligning contrivance, a plate having an impression to receive a type face and movable therewith in the leveling plane to locate the type at the printing center, and means for indicating when the type has been brought to the printing center.

8. In a type aligning contrivance, the combination with means for determining the leveling plane, of type alignment indicators, and an independent, movable matrix.

9. In a type aligning contrivance attached to a type writing machine, the combination with a device arranged in a horizontal plane centrally of the system of type-bars, a movable matrix, and a type-rest.

10. In a type aligning contrivance attached to a type writing machine, the combination with a device arranged in a horizontal plane centrally of the system of type-bars, a movable matrix, and a spring-actuated type-rest.

11. In a type aligning contrivance attached to a type writing machine, the combination with a device arranged in a horizontal plane centrally of the system of type-bars, a movable matrix, alignment indicators, and a type-rest.

12. In a type leveling and aligning contrivance, the combination of a head or block, a movable matrix, a level-indicator, and an alignment indicator.

13. In a type leveling and aligning contrivance, the combination of a head or block, a tilting and bodily movable matrix, and a movable type-rest.

14. In a type leveling and aligning contrivance, the combination of a head or block, a movable type-rest, a tilting and bodily movable matrix, a level indicating means, and alignment indicating means.

15. The combination with the top-plate of a type writing machine, of a leveling and aligning contrivance attached thereto at the same points that govern the planes of the paper-carriage and platen.

16. In a type leveling contrivance, the combination of a matrix having the bearing projection as 29, and means for indicating the level of the matrix.

17. In a type aligning contrivance, the combination of a type, a matrix, and means for indicating the alignment of the matrix.

18. In a type leveling and aligning contrivance, the combination of a type, a matrix, means for indicating the level and means for indicating the alignment of the matrix whereby the level and alignment of the type are indicated.

19. In a type leveling and aligning contrivance, the combination of a matrix having the bearing projection, and means for indicating the level and alignment of the matrix whereby the level and alignment of the type are indicated.

20. In a type leveling contrivance, the combination of an independent, detached matrix, with the block.

21. In a type leveling contrivance, the combination of a matrix having a bearing projection, and a block.

22. In a type aligning contrivance, the combination of a bodily movable matrix, with a block.

23. In a type leveling device, the combination of a plate having a type depression, a block, and indicating pins.

24. In a type leveling contrivance, the combination of a matrix having a projection, a block, and indicating pins.

25. In a type leveling contrivance, the combination of a matrix, a block, the pins, and the cap, arranged to operate substantially as described.

26. In a type leveling contrivance, the combination of a matrix having a projection, the block, the pins, and the cap, arranged to operate substantially as described.

27. In a type aligning contrivance, the combination of a matrix, the block, and the aligning indicators arranged to operate substantially as described.

28. In a type leveling and aligning contrivance, the combination of a matrix having a projection, the block, and the aligning indicators arranged to operate substantially as described.

29. The combination of a rocking or tilting matrix, and a block provided with a series of pins normally flush with the upper side of said block and adapted one or more to be projected beyond the same whenever the matrix, under pressure of a type, may be out of parallelism with the under side of said block.

30. The combination of a rocking or tilting matrix, a block provided with a series of pins adapted to be projected by said matrix, and means for mechanically indicating any projection of said pins.

31. The combination of a rocking or tilting matrix, a block provided with a series of pins, and a rotatable cap having a series of arms adapted to perform the several functions hereinbefore described.

32. The combination with a rocking or tilting matrix, of a block having a series of pins adapted to be projected above the upper surface of said block during the leveling operation, and means for preventing such projection of said pins during the alignment operation.

33. The combination with a block, of a movable matrix adapted to register therewith, and means arranged on at least two adjacent sides of said block for indicating when said matrix and block are not in register.

34. The combination with a rectangular block, of a rectangular, movable matrix adapted to register therewith, and tongues arranged on at least two adjacent sides of said block and matrix and adapted to bear against two sides of said matrix and move as the latter is moved and to thus indicate when said matrix has been adjusted to register with said block.

35. The combination with a rectangular block, of a rectangular matrix, and a series of pivoted indicators arranged on at least two adjacent sides of said block and matrix.

36. The combination of a rectangular block, a rectangular matrix, and a set of pivoted and magnifying indicators for said matrix.

37. The combination with a rectangular block, of a rectangular matrix, the set of pivoted indicators having each a straight edge, and the supports for said indicators having each also a straight edge.

38. The combination with a rectangular block, of a rectangular matrix, the slotted bars, and the spring-actuated tongues pivoted at or near their lower ends on said bars.

39. The combination of a rectangular block, a rectangular matrix, and a pair of side indicators pivotally connected to a swinging arm.

40. The combination of a rectangular block, a rectangular matrix, and the pair of side indicators pivotally mounted to be self-adjusting.

41. The combination of a rectangular block, a rectangular matrix, the pair of side indicator-bars, containing each a pivoted indicator and connected to a pivoted yoke, and an arm or support for the latter.

42. The combination with a rectangular block, of a rectangular matrix, the pair of connected side indicators, and the obliquely-pivoted arm or support therefor.

43. The combination with a rectangular block, of a rectangular matrix, and the vertical movable rear indicator.

44. The combination with a rectangular block, of a rectangular matrix, the vertical movable indicator, and the detent.

45. The combination with the rectangular block, of a rectangular matrix, a vertical, movable indicator having a stop to engage said block on its downward movement, and a spring-actuated detent.

46. The combination with a rectangular block, of a rectangular matrix, and a set of indicators adapted to be moved away from said block and matrix to a position of disuse during the leveling operation.

47. The combination with the block, and the matrix, of the side indicators, the pivoted arm or support therefor, and the cam and spring.

48. The combination of a base-plate adapted to be attached to a type writing machine, an arm hinged to said base-plate and carrying a leveling and aligning block, and means for locking said arm and holding said block rigid centrally of the system of type-bars.

49. The combination with the block, and the matrix, of a type-rest provided with jaws for grasping the stem of a type.

50. The combination with the block, and the matrix, of a type rest having a pair of jaws, one of which is pivoted and spring-acting.

51. The combination with the block, and the matrix, of a type-rest provided with a pair of jaws to grasp the stem of a type and formed beneath the same with an opening for the admission of the lower ends of the stem of the type and the free end of the type-bar.

52. The combination with the block, and the matrix, of the type-rest comprising the jaws, the opening, the handle and the sleeve, and a spring for pressing the type-rest toward the block.

53. The combination with the block, and the matrix, of a type-rest arranged to be pressed toward the block, and mounted to be rotated as well as to be moved laterally in any direction.

54. In a wrench for leveling types, the combination of the bifurcated rigid jaw formed with seats for a type-bar, and a pivoted jaw adapted to act in opposition to said rigid jaw.

55. In a wrench for leveling types, the combination of the bifurcated jaw formed with seats for a type-bar, and a spring-actuated pivoted jaw adapted to act in opposition to said rigid jaw and provided with a finger-piece.

56. In a wrench for leveling types, the combination of a handle, a rigid jaw arranged at right angles thereto, a loop between said handle and said rigid jaw, and a pivoted jaw.

57. In a wrench for leveling types, the combination of the handle, the U-shaped bend, the rigid bifurcated jaw formed with seats for one side of a type-bar, and a spring-actuated jaw pivoted at the lower end of the rigid jaw and provided with a hook adapted to engage the other side of the type-bar and act in opposition to the rigid jaw.

58. In a type leveling contrivance, the combination of the bridge, the post, the step, the spindle, the spring, 43, and the type-rest.

59. In a type aligning contrivance, the combination of the bridge, the post, the step, the spindle, the type rest, the lever, and the spring, 43.

60. In a type leveling contrivance, the combination of the bridge, the post, the step, the spindle, the type-rest, the lever, and the spring, 41.

61. In a type leveling and aligning contrivance, the combination of the bridge, the post, the step, the spindle, the type-rest, the spring, 43, the lever, and the catch to hold the lever depressed, whereby the tension of the spring is changed.

62. In a type leveling and aligning contrivance, the bridge, the post, the step, the type-rest, the lever, the springs, 41 and 43, and the catch, arranged to operate substantially as described.

63. In a type leveling and aligning contrivance, the combination of the arm 8 having the block 9, and the arm 57, fastened thereto, the spring 64, the latch, and the keeper, arranged to operate as shown and described.

64. The combination with a type writing machine, of a leveling and aligning block suspended centrally of the system of type-bars, and an independent, movable leveling and aligning plate or matrix.

Signed at Ilion, in the county of Herkimer and State of New York, this 6th day of November, A. D. 1893.

LOUIS P. DISS.

Witnesses:
B. B. VAN DEUSEN,
W. K. JENNE.